(12) United States Patent
Cho et al.

(10) Patent No.: US 10,811,145 B2
(45) Date of Patent: Oct. 20, 2020

(54) PLASMA DIAGNOSIS SYSTEM USING MULTIPLE-PATH THOMSON SCATTERING

(71) Applicant: INDUSTRY-UNIVERSITY COOPERATION FOUNDATION SOGANG UNIVERSITY, Seoul (KR)

(72) Inventors: Kyu Man Cho, Seoul (KR); Seung Hyun Yoon, Seoul (KR); Wha-Keun Ahn, Andong-si (KR); June Gyu Park, Seoul (KR)

(73) Assignee: INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 0 days.

(21) Appl. No.: 16/442,949

(22) Filed: Jun. 17, 2019

(65) Prior Publication Data

US 2019/0304611 A1    Oct. 3, 2019

Related U.S. Application Data

(63) Continuation-in-part of application No. 16/068,236, filed as application No. PCT/KR2016/003951 on Apr. 15, 2016, now abandoned.

(30) Foreign Application Priority Data

Jan. 8, 2016   (KR) .................. 10-2016-0002611

(51) Int. Cl.
  *G21B 1/23*    (2006.01)
  *G21B 1/05*    (2006.01)
  (Continued)

(52) U.S. Cl.
  CPC ............... *G21B 1/23* (2013.01); *G01N 21/21* (2013.01); *G01N 21/4795* (2013.01);
  (Continued)

(58) Field of Classification Search
  CPC .. G21B 1/23; G21B 1/057; G21K 1/10; G01J 3/4412
  See application file for complete search history.

(56) References Cited

U.S. PATENT DOCUMENTS

| 5,760,388 A | 6/1998 | Swandic |
| 2009/0231583 A1 | 9/2009 | Smith |

(Continued)

FOREIGN PATENT DOCUMENTS

| JP | 05312712 | 11/1993 |
| JP | 06102086 | 4/1994 |

(Continued)

OTHER PUBLICATIONS

E.R. Kieft, "Collective Thomson scattering experiments on a tin vapor discharge in the prepinch phase", 2004, Physical Review (Year: 2004).*

(Continued)

*Primary Examiner* — Maurice C Smith
(74) *Attorney, Agent, or Firm* — Cantor Colburn LLP

(57) ABSTRACT

Provided is a plasma diagnosis system using multiple-path Thomson scattering, including: a laser which supplies laser pulse; an optical system which is configuring to focus alternately a vertical polarization of the laser pulse and a horizontal polarization of the laser pulse on first and second focal points in a plasma; a collection optic which collects lights scattered from the first and second focal points in plasma; a polychromator which filters the lights collected by the collection optics according to spectral characteristics; and a computer which measures spectral characteristics by using the filtered lights. Thomson scattered light which is contaminated with noise due to stray lights is produced in the first collected scattering while the noise due to stray lights is produced in the second collected scattering.

8 Claims, 3 Drawing Sheets

(51) Int. Cl.
*G02B 27/28* (2006.01)
*G21K 1/10* (2006.01)
*G01N 21/21* (2006.01)
*G01N 21/47* (2006.01)

(52) U.S. Cl.
CPC ............ *G02B 27/283* (2013.01); *G21B 1/057* (2013.01); *G21K 1/10* (2013.01); *G01N 2201/0697* (2013.01)

(56) References Cited

U.S. PATENT DOCUMENTS

| | | | |
|---|---|---|---|
| 2016/0103073 A1 | 4/2016 | Ford et al. | |
| 2017/0227588 A1 | 8/2017 | Smith | |
| 2017/0280545 A1* | 9/2017 | Tomita | G01J 3/4412 |

FOREIGN PATENT DOCUMENTS

| | | |
|---|---|---|
| JP | 2003240715 | 8/2003 |
| JP | 3699682 | 9/2005 |
| KR | 20130099641 | 9/2013 |

OTHER PUBLICATIONS

Kelly Warner, "Thomson scattering from analytical plasmas", 2001,Elsevier Science (Year: 2001).*
R. Yasuhara, "Design of the polarization multi-pass Thomson scattering system", 2012, American Institute of Physics (Year: 2012).*
Kumar, et al., Design of multiple Thomson scattering diagnostic for SST-1 tokamak, Review of Scientific Instruments, 2007, pp. 043507-1-043507-8.
Murmann, et al., The Thomson scattering systems of the ASDEX upgrade tokamak, Review of Scientific Instruments, 1992, pp. 4941-4943.
Togashi, et al., Thomson scattering measurements in low-density plasmas in the TST-2 spherical tokamak, J. Inst., 2015, pp. 1-9.
International Search Report—PCT/KR2016/003951 dated Oct. 6, 2016.

* cited by examiner

PLASMA DIAGNOSIS SYSTEM USING MULTIPLE-PATH THOMSON SCATTERING

TECHNICAL FIELD

The present invention relates to a plasma diagnosis system using Thomson scattering, and more particularly, to a plasma diagnosis system using multiple-path Thomson scattering capable of measuring a pure Thomson scattering signal by removing a noise from a mixed signal of the Thomson scattering signal and the noise.

BACKGROUND ART

In tokamak-type nuclear fusion, typically, deuterium atoms and tritium atoms are heated up to so high temperature to generate a plasma state in which ionized atomic nuclei and electrons have free mobility, and plasma is confined by using a strong toroidal magnetic field, so that the nuclei overcome Coulomb force and come close enough to cause fusion reaction at sufficiently high temperature. In order to stably operate and control this high-temperature, high-density plasma state, it is necessary to know the temperature and density of plasma, and thus, accurate measurement thereof is required. As a result of this request, various types of plasma diagnosis apparatuses have been developed and used. As one of plasma diagnosis apparatuses, there is a diagnosis apparatus using Thomson scattering, which is an essential diagnosis apparatus for measuring temperature and density of electrons.

FIG. 1 is a configuration diagram schematically illustrating a diagnosis apparatus using Thompson scattering in the related art for diagnosing a state of plasma in a tokamak of a nuclear fusion reactor.

Referring to FIG. 1, a diagnosis apparatus 1 using Thomson scattering in the related art for diagnosing a state of plasma in a tokamak 5 of a nuclear fusion reactor includes a laser which outputs a strong laser pulse polarized in a vertical direction, an optical system 110 which focuses the laser beam in the vertical polarization state into a plasma in the TOKAMAK, a laser beam dump 120 which is mounted outside the tokamak and absorbs and removes the laser beam scattered from the tokamak, and a collection optic 130 which collects the light scattered by the laser beam.

More specifically, in order to measure the temperature and density of electrons in plasma, the above-described diagnosis apparatus 1 using Thomson scattering focuses a laser pulse with a single wavelength (1064 nm) having a strong electric field intensity from the outside of the tokamak 5 into plasma-filled tokamak by using the laser 100 and the optical system 110. The nuclei and electrons constituting plasma are vibrated in the polarization direction of the electric field of the laser beam according to a temporal change of the strong unidirectional electric field strength (polarized light) of the focused laser beam, and a light beam with the same frequency as the incident laser beam is scattered and is subjected to Thompson scattering. In this case, the light is not subjected to Thomson scattering in the direction parallel to the polarization direction of the laser beam. Therefore, in the case where the polarization of the laser beam incident on the cross section of the tokamak in FIG. 1 is perpendicular to this cross section, light is scattered in the direction of collection optic, so that the light can be received by the collection optic. On the contrary, in the case where the laser beam is horizontally polarized with respect to the cross section of tokamak in FIG. 1, no Thomson scattered light is scattered toward the collection optic, so that there is no Thomson scattered light received by the collection optic.

On the other hand, since plasmas are moving fast, the light has a Doppler shift in wavelength due to the Doppler effect. Therefore, the diagnosis apparatus using Thomson scattering can acquire the temperature of electrons in plasma by measuring the wavelength shift due to the Doppler effect and can also acquire the density of electrons according to the intensity of light to be measured. That is, if signals of the Thomson light in plasma are accurately measured, the temperature and density of plasma can be accurately acquired.

However, there exist the light beams that are reflected by incomplete optical parts to be incident on the tokamak and the light beams that are scattered multiple times by wall surfaces of the tokamak and the like, and these light beams are called stray light. As the background noise caused by the stray light is included in the Thomson scattering signal measured by the diagnosis apparatus using Thomson scattering in the related art, there is a problem in that the accuracy of the measured Thompson scattering signal is lowered.

SUMMARY OF THE INVENTION

Technical Problem

In order to solve the problems described above, the present invention is to provide a plasma diagnosis system using multiple-path Thompson scattering capable of measuring an accurate Thomson scattering signal from which a background scattering noise signal is removed by using an optical system including first and second beam focusing units which focus beams on different focal points in plasma.

Solution to Problems

According to an aspect of the present invention, there is provided a plasma diagnosis system using multiple-path Thompson scattering, including: a laser which outputs a laser pulse having predetermined polarization and wavelength; an optical system configured to run the laser pulse to quadruple passes along a closed optical path, focus and collimate the laser pulse when enters and exits a plasma vessel, respectively, place first and second focal points at two predetermined locations in plasma, respectively, and rotate a plane of polarization by 90 degrees at each complete pass to provide and focus alternately horizontal and vertical polarizations of the laser pulse to the focal points in plasma; a collection optic which is configured with a lens or a combination of lenses, collects lights scattered from the first and second focal points in plasma, whereas the collected light by the vertical polarization of the laser pulse is referred to as a first collected scattering and the collected light by the horizontal polarization of the laser pulse is referred to as a second collected scattering; a polychromator which filters the lights provided from the collection optics and outputs the filtered lights; and a computer which measures spectral characteristics of the first and second collected scatterings by using the filtered lights, wherein the Thomson scattered light which is contaminated with noise due to stray lights is produced in the first collected scattering while the noise due to stray lights is produced in the second collected scattering.

Therefore, multiple-path scattering in which the polarization is rotated by 90 degrees according to the number of times of propagation in plasma is generated in plasma.

Preferably, in plasma diagnosis system using multiple-path Thompson scattering according to the above aspect, the optical system may include: a polarizing beam splitter PBS which is inserted in the closed optical path and reflects or transmits an incident laser pulse according to a polarization state of the incident laser pulse; a mirror which is inserted in the closed optical path and reflects the laser pulse exited from the PBS back into the closed optical path; a first beam focusing unit, which includes a lens or a combination of lenses, configured to focus the laser pulse to the first focal point in plasma; a second beam focusing unit, which includes a lens or a combination of lenses, configured to focus the laser pulse to the second focal point in plasma; a half wave plate HWP inserted between the PBS and the first beam focusing unit and aligned to rotate a plane of polarization of the incident laser pulse by 90 degrees; an optical path changing unit which collimates the laser pulse output from the first beam focusing unit and refocuses directly onto the second focal point, and wherein the plane of polarization of the laser pulse is rotated by 90 degrees by the HWP in the beginning of the closed optical path in the first two passes and the end of the closed optical path in the next two passes so that vertical polarization of the laser pulse produces Thomson scattered light contaminated with the noise while the horizontal polarization of the laser pulse produces only the noise due to stray lights.

Preferably, if necessary, plasma diagnosis system using multiple-path Thomson scattering according to the above aspect may further include an optical isolator between the laser and the optical system, wherein the optical isolator causes the laser pulse supplied from the laser to propagate to the optical system but prevents the beam output from the optical system from entering the laser.

Preferably, plasma diagnosis system using multiple-path Thompson scattering according to the above aspect may further include a trigger module which outputs trigger signals when apart of the laser pulse is detected on a predetermined position, wherein a signal processing is synchronized by using the trigger signal. More preferably, the trigger module includes a photo detector which senses the laser pulse and outputs the detected pulse as the trigger signal for signal processing electronics.

Preferably, in plasma diagnosis system using multiple-path Thompson scattering according to the above aspect, the trigger module is disposed between the laser and the optical system or at an arbitrary position of the optical system and generates and outputs the trigger signal when detecting that the laser pulse is supplied from the laser to the optical system, detecting that the laser pulse is supplied from the optical system to plasma, or detecting that the laser pulse is supplied at an arbitrary position of the optical system.

Preferably, in plasma diagnosis system using multiple-path Thompson scattering according to the above aspect, the collection optic may be configured with first and second collection optics, wherein the first collection optic is comprising of a lens or a combination of lenses and collects a light scattered from the first focal point in plasma and sends the collected light to the polychromator to output the light collected in the first focal point as the first collection signal, and the second collection optic is comprising of a lens or a combination of lenses and collects a light scattered from the second focal point in plasma and sends the collected light collected in the second focal point to the polychromator to output the light collected in the first focal point as the first collection signal.

Preferably, in plasma diagnosis system using multiple-path Thompson scattering according to the above aspect, the computer measures spectral characteristics of the first and second collection signals and outputs the spectral characteristics. Preferably, in plasma diagnosis system using multiple-path Thompson scattering according to the above aspect, the system further includes a computer which measures a pure Thomson scattering signal by subtracting the noise obtained from the second collected scattering from the Thomson scattering signal contaminated with the noise obtained from the first collected scattering.

Preferably, the computer measures temperature and density of electrons in plasma by analyzing the spectral characteristics obtained in the polychromator.

Preferably, plasma diagnosis system using multiple-path Thomson scattering according to the above aspect may be applied to a tokamak-type nuclear fusion reactor, wherein the optical system focuses a laser pulse into a tokamak and has multiple paths to sequentially rotate polarization direction by 90 degrees, the collection optic collects scattered optical signals in the tokamak and measures the scattered optical signals for each wavelength band by using a polychromator, and the computer measures a Thomson scattering signal of plasma.

Effects of the Invention

The multiple-path plasma diagnosis system according to the present invention alternately supplies a vertical polarization of the laser pulse and a horizontal polarization of the laser pulse to a tokamak to be focused, so that it is possible to measure and supply a pure Thomson scattering signal without the noise.

The multiple-path plasma diagnosis system according to the present invention generates scattering in two different focal points inside a tokamak in a nuclear fusion reactor in a multiple path manner and measures the scattering signals in the respective focal points, so that it is possible to measure a change in scattering signal according to positions in the tokamak, it is possible to measure temperature and density of electrons according to positions of plasma inside the tokamak, and it is possible to supply more useful information.

BEST MODE FOR CARRYING OUT THE INVENTION

In a plasma diagnosis system using multiple-path Thompson scattering according to the present invention, multiple-path scatterings are generated by focusing laser pulse on two different focal points inside a tokamak of a nuclear fusion reactor, and scattering signals in the tokamak are measured in the multiple paths, so that it is possible to accurately measure the pure Thomson scattering signal without noise due to stray lights. In addition, plasma diagnosis system according to the present invention supplies and focuses alternately vertical and horizontal polarizations of the laser pulse in plasma, measures a mixed signal of a Thomson scattering signal and the noise by the vertical polarization of the laser pulse and measures the noise by the horizontal polarization of the laser pulse, removes the noise from the mixed signal, so that it is possible to accurately measure the pure Thomson scattering signal without noise.

The noise is produced by the background scattering due to stray lights and the noise is dominant in the light scattered by the horizontal polarization of the laser pulse. The Thomson scattered lights contaminated with the noise are produced by the vertical polarization of the laser pulse.

Hereinafter, a structure and operation of a plasma diagnosis system using multiple-path Thomson scattering according to a preferred embodiment of the present invention will be described in detail with reference to the accompanying drawings.

Figure 1:
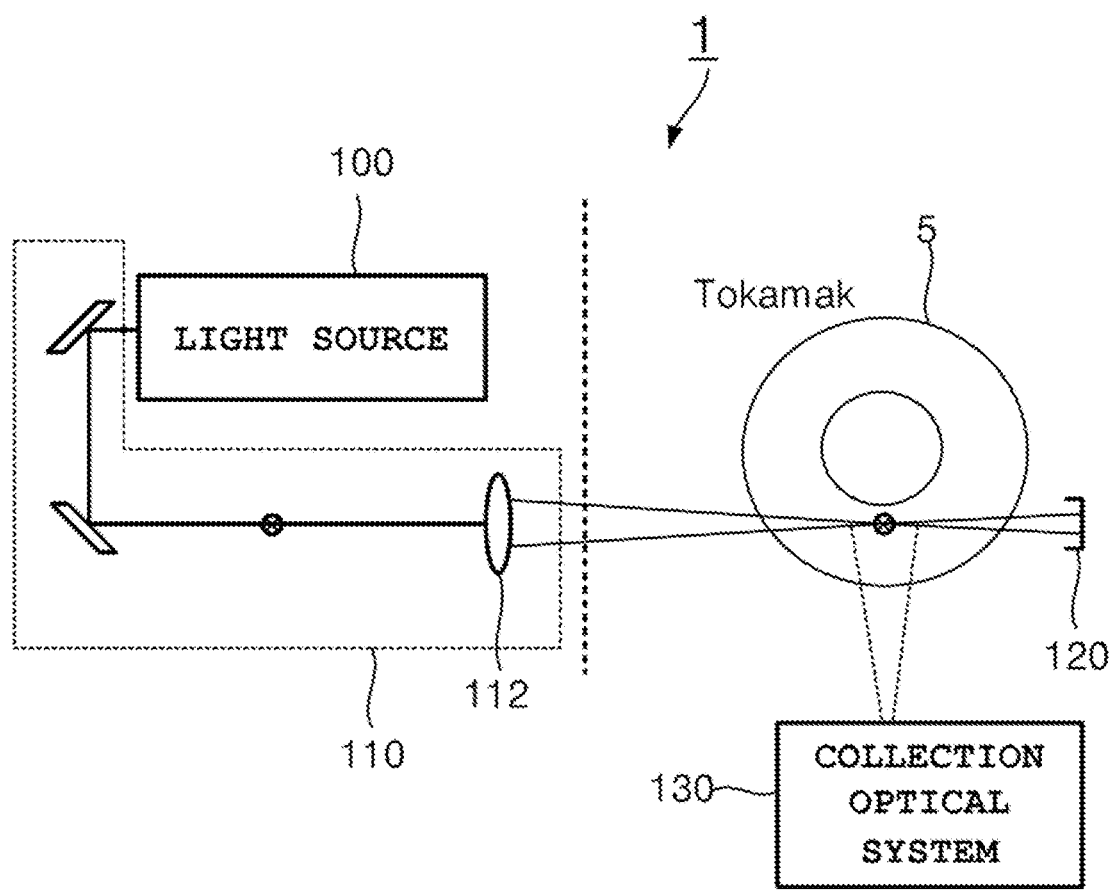
FIG. 1 is a configuration diagram schematically illustrating a diagnosis apparatus using single-path Thompson scattering in the related art for diagnosing a state of plasma in a tokamak of a nuclear fusion reactor.
Figure 2:
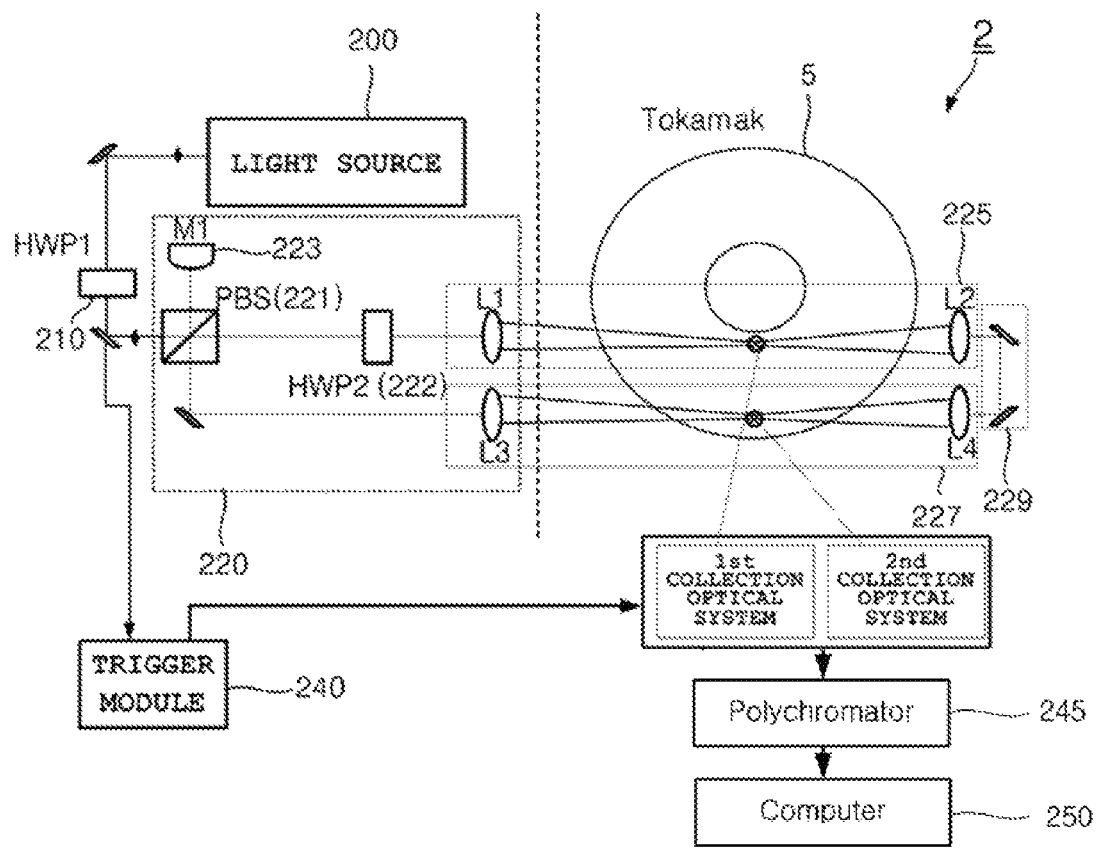
FIG. 2 is a configuration diagram schematically illustrating a plasma diagnosis system using multiple-path Thomson scattering according to a preferred embodiment of the present invention.

FIG. 2 is a configuration diagram schematically illustrating a plasma diagnosis system using multiple-path Thomson scattering according to a preferred embodiment of the present invention.

Referring to FIG. 2, a plasma diagnosis system 2 using multiple-path Thomson scattering according to the present invention is installed outside a tokamak 5 of a nuclear fusion reactor and includes a laser 200, a first half wave plate HWP 210, an optical system 220 which supplies and focuses alternately a vertical polarization of the laser pulse and a horizontal polarization of the laser pulse in plasma in the tokamak, a collection optic 230 which collects light scattered from plasma in the tokamak, a trigger module 240, polychromator 245 and a computer 250.

The laser 200 outputs a laser pulse in a horizontal polarization state with a single wavelength of 1064 nm and a strong electric field intensity.

The first half wave plate HWP 210 is disposed on the optical path of the laser pulse output from the laser and rotated a plane of a polarization of the incident laser pulse by 90 degrees to select and maintain the polarization state of the propagating laser pulse.

The optical system 220 is configured to run the laser pulse to quadruple passes along a closed optical path, focus and collimate the laser pulse in plasma when enters and exits a plasma vessel, respectively, place first and second focal points at two predetermined locations in plasma, respectively, and rotate a plane of polarization by 90 degrees at each complete pass to provide and focus alternately horizontal and vertical polarizations of the laser pulse to the focal points in plasma. The optical system 220 is provided between the laser and the tokamak 5 to supply and focus alternately a vertical polarization of the laser pulse and a horizontal polarization of the laser pulse to plasma in the tokamak when the laser pulse is supplied from the laser. The optical system is configuring to alternately focus the vertical and horizontal polarizations of the laser pulse on first and second focal points in a plasma.

The optical system 220 includes a polarizing beam splitter PBS 221 disposed on the optical path of the laser pulse supplied from the laser, a mirror 223, a second half wave plate HWP 222, a first beam focusing unit 225, a second beam focusing unit 227, and an optical path changing unit 229.

The PBS 221 is inserted in the closed optical path and reflects or transmits an incident laser pulse according to a polarization state of the incident laser pulse. The PBS transmits the horizontal polarization beam and reflects the vertical polarization beam. Therefore, a beam having two polarization components may be split to two paths by passing through the PBS.

The mirror 223 is inserted in the closed optical path and reflects the laser pulse exited from the PBS back into the closed optical path. The mirror is disposed on the optical path in which the laser pulse supplied from the laser is reflected by the PBS, so that the laser pulse reflected from the PBS is supplied to the PBS again.

The second HWP 222 is inserted between the PBS and the first beam focusing unit and aligned to rotate a plane of polarization of the incident laser pulse by 90 degrees. The HWP is disposed between the PBS and the first beam focusing unit. The second HWP 222 may be disposed between the PBS 221 and the first beam focusing unit 225 to rotate the polarization state of the incident laser pulse by 90 degrees and outputs the rotated laser pulse. Therefore, by the polarization rotation in the second HWP 222, the horizontal polarization of the laser pulse is converted into the vertical polarization, and the vertical polarization of the laser pulse is converted into the horizontal polarization. The second HWP may not be used depending on the Thomson scattering and the position of the optical system which collects Thomson scattered lights.

The first beam focusing unit 225 includes a lens or a combination of lenses and is configured to focus the laser pulse on the first focal point in plasma. An example of the combination of lenses is comprising of two convex lenses L1 and L2 which are disposed at positions separated by certain distances from the two ends of the tokamak of the nuclear fusion reactor so that the laser pulse is focused on the first focal point inside plasma. The first beam focusing unit is disposed on the optical path in which the horizontal polarization beam supplied from the laser passes through the PBS and is converted into a vertical polarization beam by the second HWP.

The second beam focusing unit 227 includes a lens or a combination of lenses and is configured to focus the laser pulse on the second focal point in plasma. An example of the combination of lenses is comprising of two convex lenses L3 and L4 which is disposed at positions separated by certain distances from two ends of the tokamak of the nuclear fusion reactor so that the laser pulse is focused on the second focal point in plasma. Meanwhile, the second beam focusing unit 227 is configured so that the horizontal polarization beam reflected from the reflecting mirror 223 passes through the PBS to be incident or is configured so that the vertical polarization beam output from the first beam focusing unit 225 is reflected by the PBS to be incident.

These convex lenses constituting the first and second beam focusing units 225 and 227 are generally installed outside the tokamak. However, these convex lenses may be installed inside the tokamak depending on the shape of the tokamak.

The optical path changing unit 229 may be configured with the optical path changing elements such as prisms, folding mirrors, or a combination of prisms and folding mirrors so as to supply and refocus the laser pulse output from the first optical focusing unit to the second optical focusing unit or so as to supply and refocus the laser pulse output from the second optical focusing unit to the first optical focusing unit.

The optical path changing unit collimates the laser pulses output from the first beam focusing unit, folds the beam path to form the closed optical path and refocuses directly onto the second focal point. In addition, the optical path changing unit collimates the laser pulse output from the second region and sends the laser pulse into the other input port of the PBS where the incident pulse in the first closed path is reflected.

The plane of polarization of the laser pulse is rotated by 90 degrees by the HWP in the beginning of the closed optical path in the first two passes and the end of the closed optical path in the next two passes so that the vertical polarization of the laser pulse produces Thomson light contaminated with the noise while the horizontal polarization of the laser pulse produces only the noise due to stray lights.

In plasma diagnosis system having the above-described configuration according to the present invention, the vertical and horizontal polarizations of the laser pulse are supplied alternately to first and second focal points in plasma in the tokamak of the nuclear fusion reactor through the first and second beam focusing units of the optical system, so that multiple-path scatterings are generated in plasma. In particular, when the vertical polarization of the laser pulse is supplied by the first and second beam focusing units, Thompson scattering is generated in the first and second focal points of plasma, and when the horizontal polarization of the laser pulse is supplied, Thomson scattering is not generated in the first and second focal points.

The collection optic 230 collects the lights scattered from the first and second focal points in plasma and supplies the collection signals to the polychromator 245.

The collected light is referred to as "first collected scattering" if the plane of polarization of the laser pulse is orthogonal (referred to as "vertical polarization of the laser pulse") to the plane containing optic axis of the collection optics and the propagation vector of the laser pulse. In addition, the collected light is referred to as "second collected scattering" if the plane of polarization of the laser pulse is parallel (referred to as "horizontal polarization of the laser pulse") to the plane containing optic axis of the collection optics and the propagation vector of the laser pulse. Thomson scattered lights are contaminated with the noise due to stray lights in the first collected scattering while the noise due to stray lights are dominant in the second collected scattering.

The trigger module 240 outputs trigger signals when a part of the laser pulse is detected on a predetermined position. Signal processing of the signal processing electronics, for examples the polychromator or the computer, is synchronized by using the trigger signal. The trigger module includes a high-speed photo detector which detects the individual laser pulse from a weakly reflecting surface of an optical component or leaking through an imperfect mirror and outputs the detected pulse as the trigger for the signal processing electronics.

The trigger module generates a trigger signal and outputs the trigger signal to the polychromator and/or the computer when the laser pulse is supplied from the optical system. The trigger module may detect an extra laser beam signal transmitted through a folding mirror disposed at a trigger point set between the laser and the optical system or at an arbitrary position of the optical system to use the extra laser beam signal as a trigger signal.

The collection optic 230 may be configured with a single collection optic or may be configured with a first collection optic for the first focal point in plasma inside the tokamak and a second collection optic for the second focal point in plasma. In the case where the collection optic is configured with the first collection optic and the second collection optic, an average value of the collection signals measured by the first and second collection optics is used as a collection signal, so that the error in the collection signal depending on measurement position inside the tokamak can be minimized.

The first collection optic is comprising of a lens or a combination of lenses and collects a light scattered from the first focal point in plasma and sends the collected light to the polychromator to output the light collected in the first focal point as the first collection signal. The second collection optic is comprising of a lens or a combination of lenses and collects a light scattered from the second focal point in plasma and sends the collected light to the polychromator to output the light collected in the second focal point as the second collection signal.

The collection optic collects the lights scattered from the focal points in plasma and sends the collected lights to the polychromator by using a proper optics such as a wide aperture optical fiber.

The first collection signal is a signal obtained by collecting lights scattered from the first focal point in plasma by the laser pulse focused by the first focusing unit, and the second collection signal is a signal obtained by collecting signals scattered from plasma by the laser pulse focused by the second focusing unit. The first and second collection signals are configured with one of a noise and a mixed signal formed by mixing a Thomson scattering signal and the noise. The first and second collection signals are determined according to the polarization state of the laser pulse focused on plasma. In the case where the vertical polarization of the laser pulse is focused on plasma, the first and second collection signals are configured with the Thomson scattering signal with the noise according to the first collected scattering, that is a mixed signal of the Thomson scattering signal and the noise. In the case where the horizontal polarization of the laser pulse is focused on plasma, Thompson scattering is not generated, so that the first and second collection signals are configured with only the noise without the Thomson scattering signal according to the second collected scattering.

The polychromator 245 may be consisted of typically 5 channels of broad band pass filters which can be used for analyzing spectral characteristics of the lights, which are the first and second collection signals. Each channel of the polychromator filters the lights provided from the collection optic according to spectral characteristics. Therefore, the polychromator outputs the filtered lights to the data acquisition system 250.

The data acquisition system 250 may be included amplifiers and a computer which measures and analyses spectral characteristics by using the filtered lights provided from the polychromator and measures a Thomson scattering signal by using the spectral characteristics. The computer of the data acquisition system 250 measures a Thomson scattering signal without the noise by using the first and second collection signals and supplies the pure Thomson scattering signal without the noise.

The computer of the data acquisition system 250 may measure temperature and density of electrons in plasma by analyzing the spectral characteristics obtained in the polychromator.

More specifically, the computer allows Thomson scattering to be generated from plasma in the tokamak by the vertical polarization of the laser pulse and measures the mixed signal of the Thomson scattering signal and the noise. In addition, the computer allows Thomson scattering not to be generated from plasma in the tokamak by the horizontal polarization of the laser pulse and measures a signal configured with only the noise. Therefore, the computer can accurately measure only the pure Thomson scattering signal by removing the noise from the mixed signal of the Thompson scattering signal and the noise.

Hereinafter, the operation of plasma diagnosis system using multiple-path Thompson scattering having the above-described configuration according to the preferred embodiment of the present invention will be described in detail with reference to FIG. 3. In plasma diagnosis system according to the preferred embodiment of the present invention, when the laser pulse in the horizontal polarization state is output from the laser, the laser pulse is reciprocated four times through the optical system, so that Thompson scatterings are generated in plasma.

Figure 3:
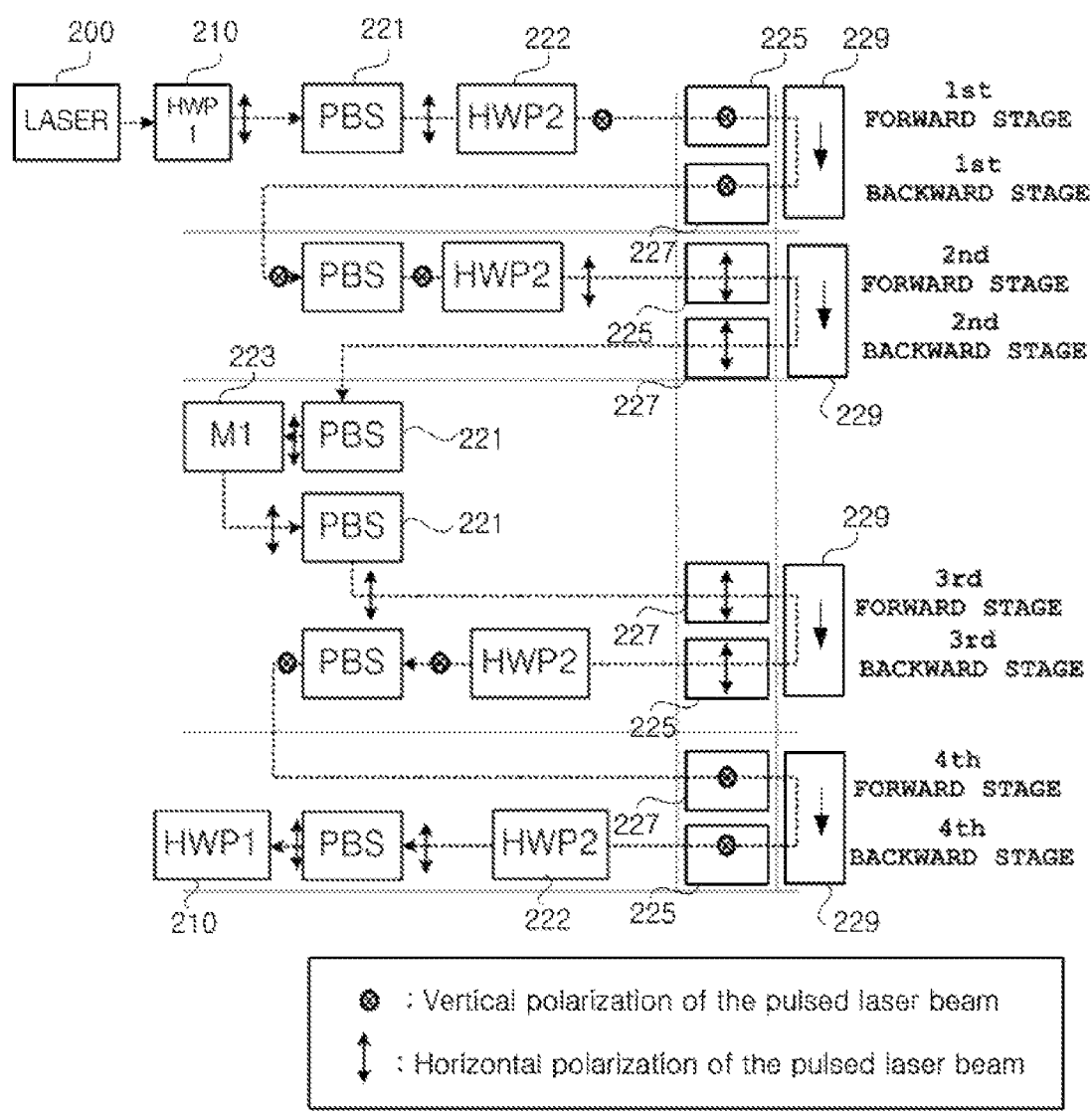
FIG. 3 is a diagram illustrating the optical multiple-path (that is, quadruple passes) of the laser pulse and polarization states of a laser pulse in each stage in plasma diagnosis system using multiple-path Thomson scattering according to the preferred embodiment of the present invention.

FIG. 3 is a diagram illustrating a polarization state of the laser pulse in each stage in plasma diagnosis system using multiple-path Thompson scattering according to the preferred embodiment of the present invention.

Referring to FIG. 3, when the horizontal polarization of the laser pulse is outputted from the laser, in the first forward stage, the horizontal polarization of the laser pulse passes through the PBS 221, converts into the vertical polarization of the laser pulse by the second HWP 222, and is focused on the first focal point in plasma by the first beam focusing unit 225, so that the Thomson scattered light and the noise are generated by the vertical polarization of the laser pulse.

The Thomson scattered light is contaminated with the noise due to stray lights. The background scattering is produced due to stray lights and becomes the noise. At this time, the first collection optic, the polychromator and the computer measure the first-1 collection signal in which the noise and the Thomson scattering signal are mixed.

The laser pulse outputs from the first beam focusing unit 225 changes the optical path and supplies into the second beam focusing unit 227 by the optical path changing unit 229.

In the first backward stage, the vertical polarization of the laser pulse that has passed through the tokamak is focused again on the second focal point in plasma inside the tokamak by the second beam focusing unit 227, so that the Thomson scattering and the background scattering are generated. At this time, the second collection optic measures the first-2 collection signal in which the noise and the Thomson scattered light are mixed. Then, the vertical polarization of the laser pulse is reflected by the PBS 221 and propagates to the second forward stage.

In the second forward stage, after being incident on the PBS 221 and reflected therefrom, the vertical polarization of the laser pulse is rotated by 90 degrees by the second HWP 222 to be converted into the horizontal polarization. The horizontal polarization of the laser pulse is focused on the first focal point inside the tokamak, so that only the background scattering due to stray lights is generated. At this time, the first collection optic measures the second-1 collection signal configured with only the noise for the first focal point.

In the second backward stage, the horizontal polarization of the laser pulse that has passed through the first focal point inside the tokamak is focused again on the second focal point inside the tokamak and is incident on the PBS 221 without Thomson scattering. The horizontal polarization of the laser pulse passes through the PBS and propagates to the reflecting mirror 223. At this time, the second collection optic measures only the second-2 collection signal configured with only the noise.

In the third forward stage, the horizontal polarization of the laser pulse passes through the PBS 221 and is focused on the second focal point inside the tokamak by the second beam focusing unit 227, so that only the background scattering is generated. At this time, the second collection optic measures the third-1 collection signal configured with only the noise.

In the third backward stage, the horizontal polarization of the laser pulse output from the second beam focusing unit 227 changes the optical path and supplies into the first beam focusing unit 225 by the optical path changing unit 229.

The horizontal polarization of the laser pulse has passed through the second focal point inside the tokamak is focused again on the first focal point inside the tokamak by the first beam focusing unit 225, so that only background scattering is generated.

At this time, the first collection optic measures the third-2 collection signal configured with only the noise.

After that, this beam is incident on the second HWP 222. The horizontal polarization of the laser pulse is rotated by 90 degrees and is converted into the vertical polarization, which is incident on the PBS.

In the fourth forward stage, the vertical polarization of the laser pulse is incident on the PBS and is focused into the second focal point inside the tokamak by the second beam focusing unit 227, so that Thomson scattered lights are generated. At this time, the second collection optic measures the fourth-1 collection signal in which the noise and the Thompson scattering signal are mixed.

In the fourth backward stage, the vertical polarization of the laser pulse is focused into the first focal point inside the tokamak the first beam focusing unit 225, so that Thomson scattered lights are generated. At this time, the first collection optic measures the fourth-2 collection signal in which the noise and the Thompson scattering signal are mixed.

The computer receives the first-1, first-2, fourth-1, and fourth-2 collection signals in which the noise and the Thomson scattering signal are mixed from the first and second collection optics and receives the second-1, second-2, third-1, and third-2 collection signals configured with only the noise. By using these collection signals, the computer can accurately measure the pure Thomson scattering signal without noise. The computer can minimize the error according to the position of the tokamak by using the average value from summation of the respective collection signals.

As described above, plasma diagnosis system using the Thomson scattering according to the present invention can accurately measure the Thomson scattering signal.

In addition, plasma diagnosis system according to the present invention can be applied to a tokamak-type nuclear fusion reactor. In this case, the optical system focuses the laser pulse into the tokamak, the collection optic collects scattered optical signals from the tokamak, and the computer measures the Thomson scattering signal without noise.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

INDUSTRIAL APPLICABILITY

Plasma diagnosis system according to the present invention can be used variously in apparatuses requiring measurement of the temperature and density of plasma, and in particular, can be used to diagnose the state of plasma inside a tokamak-type nuclear fusion reactor.

The invention claimed is:

1. A plasma diagnosis system using multiple-path Thomson scattering, comprising:
    a laser which outputs a laser pulse having predetermined polarization and wavelength;
    an optical system configured to run the laser pulse along a closed optical path and focus alternately horizontal and vertical polarizations of the laser pulse to a first and second focal points in plasma, which the first and second focal points are predetermined locations in plasma;
    a collection optic which is configured with a lens or a combination of lenses, collects lights scattered from the first and second focal points in plasma, whereas the collected light by the vertical polarization of the laser pulse is referred to as a first collected scattering and the collected light by the horizontal polarization of the laser pulse is referred to as a second collected scattering;
    a polychromator which is consisted of multiple channels of band pass filters which filter the lights collected by the collection optic according to spectral characteristics and output the filtered lights; and
    a computer which measures spectral characteristics of the first and second collected scatterings by using the filtered lights output from the polychromator,
    wherein Thomson scattered light which is contaminated with noise due to stray lights is produced in the first collected scattering while the noise due to stray lights is produced in the second collected scattering.

2. Plasma diagnosis system according to claim 1, wherein the optical system includes:
    a polarizing beam splitter PBS which is inserted in the closed optical path and reflects and transmits an incident laser pulse according to a polarization state of the incident laser pulse;
    a mirror which is inserted in the closed optical path and reflects the laser pulse exited from the PBS back into the closed optical path;
    a first beam focusing unit, which includes a lens or a combination of lenses, configured to focus the laser pulse to the first focal point in plasma;
    a second beam focusing unit, which includes a lens or a combination of lenses, configured to focus the laser pulse to the second focal point in plasma;
    a half wave plate HWP inserted between the PBS and the first beam focusing unit and aligned to rotate a plane of polarization of the incident laser pulse by 90 degrees; and
    an optical path changing unit which collimates the laser pulse output from the first beam focusing unit and refocuses directly onto the second focal point.

3. Plasma diagnosis system according to claim 1, further comprising an optical isolator between the laser and the optical system,
    wherein the optical isolator prevents any back reflected and/or lights from feeding back into the laser.

4. Plasma diagnosis system according to claim 1, further comprising a trigger module which outputs trigger signals when a part of the laser pulse is detected on a predetermined position,
    wherein a signal processing is synchronized by using the trigger signal.

5. Plasma diagnosis system according to claim 4, wherein the trigger module includes a photo detector which detects the laser pulse and outputs the detected pulse as the trigger signal for signal processing electronics.

6. Plasma diagnosis system according to claim 1, wherein the collection optic is configured with first and second collection optics, and
    wherein the first collection optic is comprising of a lens or a combination of lenses and collects a light scattered from the first focal point in plasma and sends the collected light to the polychromator to output the collected light in the first focal point as the first collection signal, and
    wherein the second collection optics is comprising of a lens or a combination of lenses and collects a light scattered from the second focal point in plasma and sends the collected light to the polychromator to output the collected light in the first focal point as the first collection signal.

7. Plasma diagnosis system according to claim 1, wherein the computer measures a pure Thomson scattering signal without noise by subtracting the noise obtained from the second collected scattering from the Thomson scattering signal contaminated with the noise obtained from the first collected scattering.

8. Plasma diagnosis system according to claim 1, wherein the computer measures temperature and density of electrons in plasma by analyzing the spectral characteristics obtained in the polychromator.

* * * * *